US007474946B2

(12) United States Patent
Kamiya

(10) Patent No.: US 7,474,946 B2
(45) Date of Patent: Jan. 6, 2009

(54) IMPROPER-CONTROL DETECTION SYSTEM FOR DRIVING SUPPORT

(75) Inventor: Shinji Kamiya, Kariya (JP)

(73) Assignee: Denso Corporation, Kariya (JP)

( * ) Notice: Subject to any disclaimer, the term of this patent is extended or adjusted under 35 U.S.C. 154(b) by 485 days.

(21) Appl. No.: 11/191,648

(22) Filed: Jul. 28, 2005

(65) Prior Publication Data

US 2006/0030984 A1 Feb. 9, 2006

(30) Foreign Application Priority Data

Aug. 6, 2004 (JP) ............................ 2004-230811

(51) Int. Cl.
*G06F 19/00* (2006.01)

(52) U.S. Cl. ............................ 701/33; 701/29; 701/36

(58) Field of Classification Search .................. 701/29, 701/33, 36, 24

See application file for complete search history.

(56) References Cited

U.S. PATENT DOCUMENTS

| | | | | |
|---|---|---|---|---|
| 4,688,244 | A * | 8/1987 | Hannon et al. | 377/58 |
| 6,912,452 | B2 | 6/2005 | Sakamoto et al. | |
| 7,117,075 | B1 * | 10/2006 | Larschan et al. | 701/35 |

FOREIGN PATENT DOCUMENTS

| | | |
|---|---|---|
| JP | 03-280110 | 12/1991 |
| JP | U-7-6896 | 1/1995 |
| JP | 11-078934 | 3/1999 |

OTHER PUBLICATIONS

Office Action dated Dec. 11, 2007 in Japanese Application No. 2004-230811 with English translation.

* cited by examiner

*Primary Examiner*—Yonel Beaulieu
(74) *Attorney, Agent, or Firm*—Harness, Dickey & Pierce, PLC

(57) ABSTRACT

An improper-control detection system for driving support consists of an in-vehicle detection system that is mounted in a vehicle and a center device that is in a center and communicates with the in-vehicle detection system. When the in-vehicle detection system detects an improper-control operation that a driver conducts during an automatic control that supports driving of the driver based on an algorithm of a driving support system so as to change to a manual control contrary to the automatic control, the in-vehicle detection system sends to the center device improper-control information that includes at least one of a time, a position, a version of the driving support system, and a determination value. The center device collects and analyzes the improper-control information sent from the in-vehicle detection system to then designate a cause of the improper-control operation.

5 Claims, 4 Drawing Sheets

IMPROPER-CONTROL DETECTION SYSTEM FOR DRIVING SUPPORT

CROSS REFERENCE TO RELATED APPLICATIONS

This application is based on and incorporates herein by reference Japanese Patent Application No. 2004-230811 filed on Aug. 6, 2004.

FIELD OF THE INVENTION

The present invention relates to an improper-control detection system for driving support. The system includes an in-vehicle detection system and a center device, both of which are able to communicate with each other. The present invention further relates to the in-vehicle detection system and the center device.

BACKGROUND OF THE INVENTION

Automating vehicle controls has been recently remarkably developing. A driving support system is one of the automated vehicle control systems to support driver's driving. The driving support system photographs white lines of lanes or measures distances with following vehicles to thereby automatically control a steering device, a brake device, or an accelerator device. A load of the driver thereby decreases.

This kind of driving support systems needs to newly develop algorithms for enhancing its functions. The newly-developed algorithms may include defects having dangerousness to cause vehicular accidents, so the algorithms need verifications under factual vehicle traveling in various conditions. One of the verifications under factual vehicle traveling is described in JP-H7-6896 U.

This verification is conducted by only an automobile manufacturer, so the verification has temporal, personnel, or physical restrictions. Consequently, the algorithms are developed without sufficiently reflecting actual performances in fields where users actually use the algorithm or the driving support system. The enhancement of functions in the driving support systems is not sufficiently achieved.

SUMMARY OF THE INVENTION

It is an object of the present invention to provide an improper-control detection system for driving support, an in-vehicle detection system, and a center device, each of which is able to achieve developments of new algorithms by reflecting actual performances in fields that users actually use and to achieve enhancement of functions in the algorithms.

To achieve the above object, an improper-control detection system for driving support is provided with the following: An in-vehicle detection system mounted in a vehicle is included. A center device in a center is included to communicate with the in-vehicle detection system. When the in-vehicle detection system detects an improper-control operation that a driver of the vehicle conducts during an automatic control that supports driving of the driver based on an algorithm of a driving support system so as to change to a manual control contrary to the automatic control, the in-vehicle detection system sends to the center device improper-control information that includes at least one of a time, a position, a version of the driving support system, and a determination value. The center device collects and analyzes the improper-control information sent from the in-vehicle detection system to then designate a cause of the improper-control operation.

If a driving support system is able to achieve an accurate control response by sufficiently studying usage conditions where drivers use the driving support system, the drivers may need no additional operations. The present invention focuses on a possibility: drivers may operate for changing to a manual control contrary to an automatic control in a case where an algorithm of a driving support system has insufficiently studied usage conditions where the drivers use the driving support system. Under the structure of the present invention, an improper-control information obtained because of a driver's improper-control operation is sent to the center device, so that enhancement of the driving support system can be eventually achieved.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
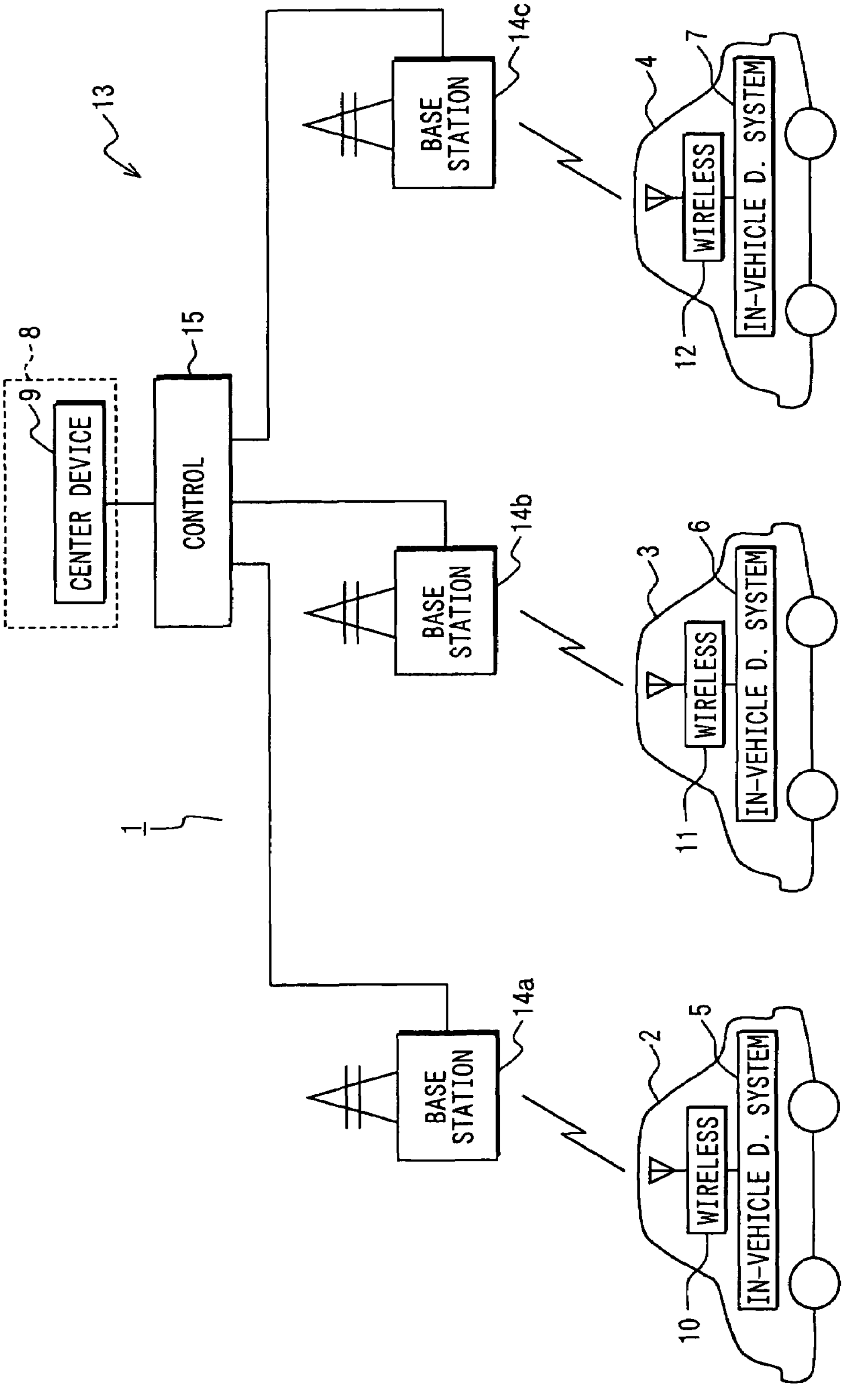
FIG. 1 is a diagram of an overall structure of an improper-control detection system for driving support according to an embodiment of the present invention.

An improper-control detection system 1 for driving support according to an embodiment of the present invention will be explained below. As shown in FIG. 1, the improper-control detection system 1 includes an in-vehicle detection system 5 to 7 mounted in a vehicle 2 to 4, and a center device 9 in a center 8.

The in-vehicle detection system 5 to 7 connects with a network 13 to communicate via the network 13 with outsides using an in-vehicle wireless terminal 10 to 12. The network 13, here, is a wide-area wireless network having an infrastructure with a base station 14*a* to 14*c* and a communication-line control device 15, as shown in FIG. 1; however, the network 13 can be a small-area (or dedicated short range) wireless network having an infrastructure with a roadside device and a wireless LAN system. Furthermore, the network 13 can be a combination of the wide-area network and the small-area network.

Figure 2:
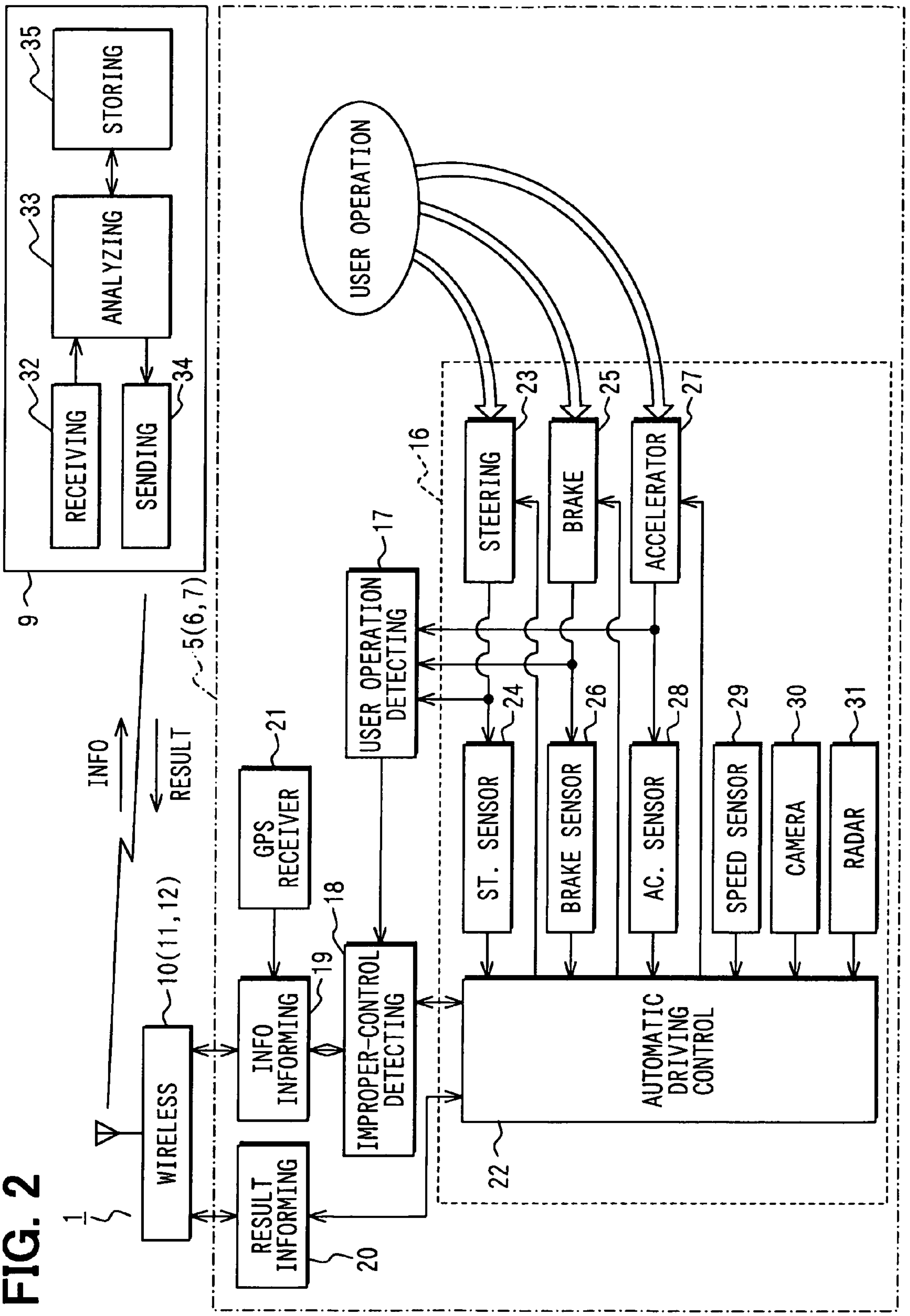
FIG. 2 is a functional block diagram showing of the improper-control detection system for driving support.

FIG. 2 shows a structure of the in-vehicle detection system 5 (as a representative of the in-vehicle detection systems 5 to 7) and the center device 9 by using a functional block diagram. The in-vehicle detection system 5 includes a driving support system 16, a user operation detecting device 17, an improper-control detecting device 18, an improper-control information informing device 19, an analysis result informing device 20, and a GPS receiver 21.

The driving support system 16 includes an automatic driving control device 22, a steering sensor 24 that detects operation of a steering device 23, a brake sensor 26 that detects operation of a brake device 25, an accelerator sensor 28 that detects an accelerator device 27, a speed sensor 29 that detects a vehicle speed, an in-vehicle camera 30 that photographs surroundings of the vehicle 2, a millimeter radar 31 that measures a distance to a following vehicle.

The automatic driving control device 22 analyzes various detection signals or measurement signals from the sensors or the like 24, 26, 28, 29, 30, 31 and then conducts an automatic driving control by controlling the devices 23, 25, 27 based on an algorithm stored in its storage area.

The user operation detecting device 17 detects an improper-control operation by a driver based on an output signal. The improper-control operation means an operation that a driver conducts during an automatic control of the driving support system 16 for changing to a manual control contrary to the automatic control. The output signal is outputted from the steering device 23 to the steering sensor 24, from the brake device 25 to the brake sensor 26, or from the accelerator device 27 to the accelerator sensor 28.

When any one of a steering system, a brake pedal, and an accelerator pedal is operated by the user or the driver contrary to the automatic control of the driving support system 16, the above output signal varies in its output states from that during the automatic control. This variation is detected by the user operation detecting device 17 to detect whether the above improper-control operation is conducted by the user for changing to a manual control contrary to an automatic control of the driving support system 16. When the user operation detecting device 17 detects the improper-control operation of the user, the user operation detecting device 17 outputs an operation detection signal to the improper-control detecting device 18.

When the improper-control detecting device 18 receives the operation detection signal, the improper-control detecting device 18 obtains from the automatic driving control device 22 a version of the driving support system 16 (a version of an algorithm) and a detection value (a parameter necessary for the automatic control) to then output them the improper-control information informing device 19. The GPS receiver 21 demodulates GPS radio waves sent from GPS satellites and obtains a time (absolute time) and a position of the vehicle 2 to then output the obtained time and position to the improper-control information informing device 19.

When the improper-control information informing device 19 receives the time and the position of the vehicle 2 from the GPS receiver 21 and the version of an algorithm and the detection value from the improper-control detecting device 18, the improper-control information informing device 19 sends those information as improper-control information to the center device 9 via the network 13 from the in-vehicle wireless terminal 10. Thereafter, when the wireless terminal 10 receives an analysis result via the network 13 from the center device 9, the wireless terminal 10 sends it to the analysis result informing device 20. The analysis result informing device 20 then outputs it to the automatic driving control device 22.

In contrast, the center device 9 includes an improper-control information receiving device 32, an improper-control information analyzing device 33, an analysis result sending device 34, and an analysis result storing device 35. The improper-control information receiving device 32 receives the improper-control information via the network 13 from the in-vehicle detection system 5. The improper-control information analyzing device 33 then analyzes the improper-control information received from the improper-control information receiving device 32 to thereby designate a cause of the improper-control operation by the user for changing to the manual control. The analysis result sending device 34 sends the analysis result obtained from the improper-control information analyzing device 33 to the in-vehicle detection system 5. The analysis result storing device 35 stores the analysis result obtained by the improper-control information analyzing device 33 in a storage medium such as a CD-ROM or a memory card.

Next, the function of the above structure will be explained with reference to FIGS. 3. 4 that show flows of processes in the in-vehicle detection system 5 and the center device 9.

If the driving support system 16 is able to achieve an accurate control response by sufficiently studying usage conditions where drivers use the driving support system, the drivers may need no additional operations. In contrast, when the driving support system 16 insufficiently studies usage conditions where drivers use the driving support system, drivers may operate for changing to a manual control contrary to an automatic control of the driving support system 16. For instance, if a vehicle travels by an automatic control without crossing over white lines of lane markers while the automatic driving support system 16 conducts an automatic control, a user or a driver conducts no additional operations for the steering system. In contrast, when the vehicle crosses over the white lines, the user needs to operate the steering system contrary to the automatic control of the driving support system 16 so as to secure safety of the user.

Figure 3:
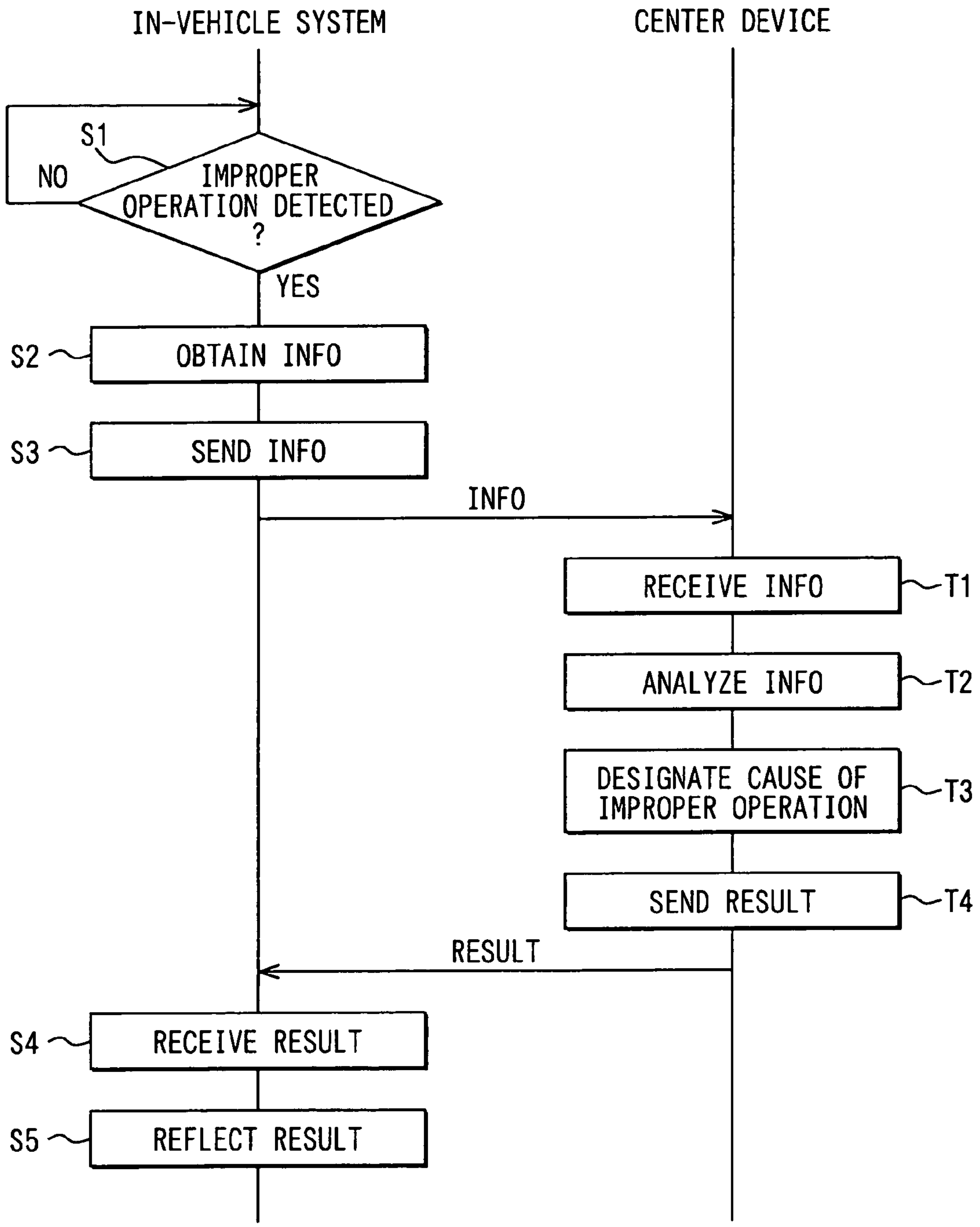
FIGS. 3, 4 are flowchart diagrams showing processes of an in-vehicle detection system and a center device.

Back to FIG. 3, at Step S1, the in-vehicle detection system 5 determines whether an improper-control operation by a user is detected by the user operation detecting device 17. When this determination is affirmed (YES at Step S1), at Step S2 improper-control information is obtained using the improper-control information informing device 19; the improper-control information includes a time and a vehicle position at this moment, a version of the driving support system 16, and a determination value. Then, at Step S3, the improper-control information is sent to the center device 9 from the in-vehicle wireless terminal 10.

Next, at Step T1, the center device 9 receives the improper-control information; then at Step T2, the center device 9 analyzes the received improper-control information in the improper-control information analyzing device 33 to thereby at Step T3 designate a cause of the improper-control operation by the user. Here, analyzing to designate the cause can be conducted based on improper-control information from a single in-vehicle detection system 5. Furthermore, analyzing to designate the cause can be conducted statistically based on improper-control information from multiple in-vehicle detection systems 5 to 7. Then, at Step T4 the center device 9 sends the analysis result to the in-vehicle detection system 5 from the analysis result sending device 34.

Next, at Step S4, the in-vehicle detection system 5 receives the analysis result in the wireless terminal 10 via the network 13; then, at Step S5, the in-vehicle detection system 5 updates partially or entirely the algorithm of the driving support system 16 according to the analysis result to thereby reflect the analysis result on the automatic driving control device 22 of the driving support system 16.

Figure 4:
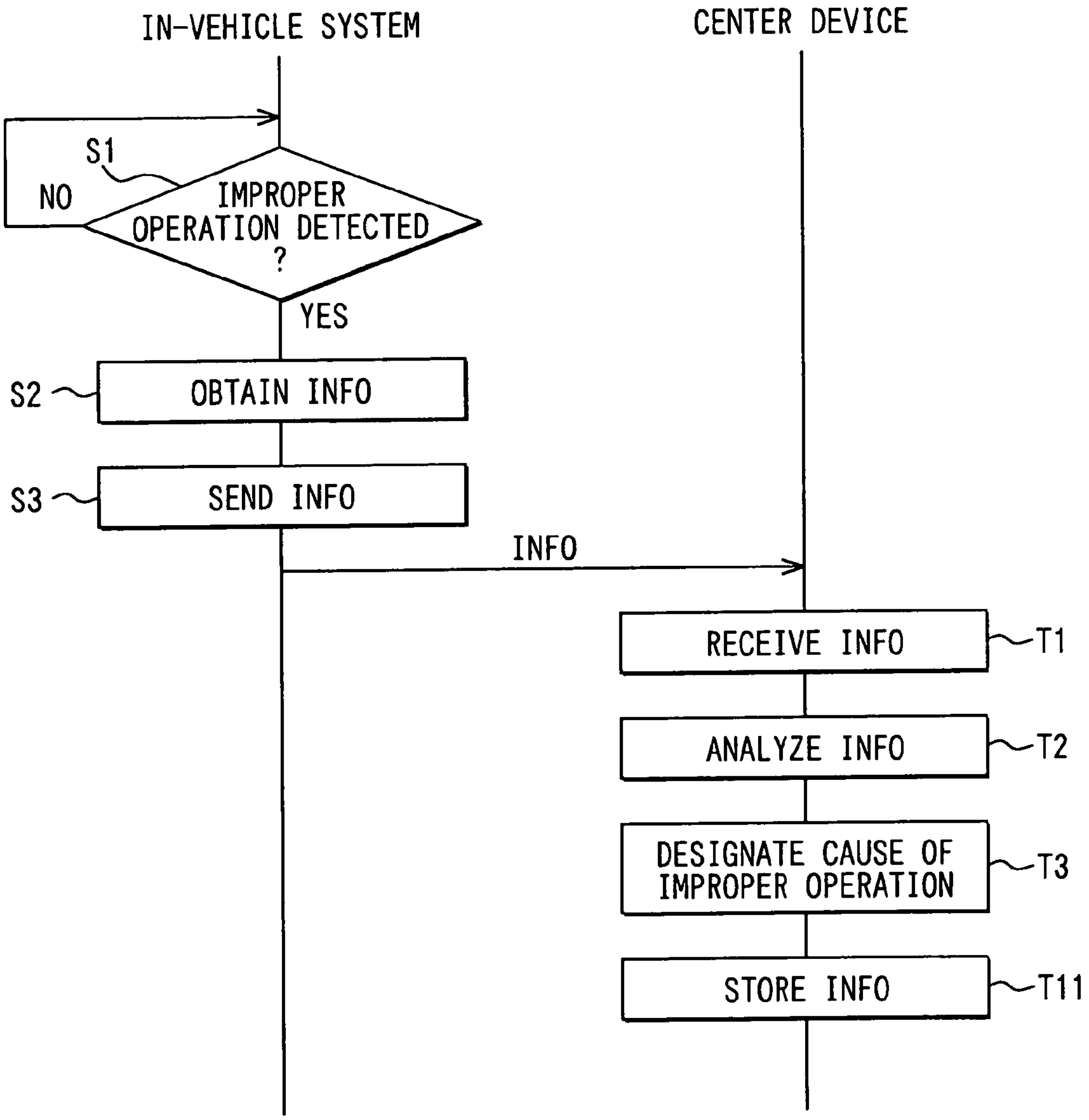

In the above structure of the process, the center device 9 sends the analysis result to the in-vehicle detection system 5 promptly. However, it can be alternatively designed as shown at Step T11 in FIG. 4. Here, the analysis result is stored by the analysis result storing device 35 in a storage medium in a form so that the analysis result can be reflected on the driving support system 16. In this case, the analysis result stored in the storage medium is reflected via an operator of an automobile manufacturer or a sales shop on the driving support system 16 at developing the next product or at inspecting vehicles.

According to thus explained embodiment of an improper-control detection system 1 for driving support, the following takes place: When a user or a driver operates for changing to a manual control, contrary to an automatic control of a driving support system 16 based on a given algorithm, an in-vehicle detection system 5 sends improper-control information including a time and a vehicle position at this moment, a version of the driving support system 16, and a detection value to a center device 9. The center device 9 receives this improper-control information and collects to analyze it to thereby designate a cause of the improper-control operation by the user. Therefore, the algorithm can be developed by being sufficiently reflected on actual performances under fields where users use the driving support system 16, which can significantly achieve enhancement of functions in the driving support system 16.

Furthermore, the center device 9 sends the analysis result to the in-vehicle detection system 5; the in-vehicle detection system 5 thereby reflects the analysis result on the driving support system 16. Therefore, even when the algorithm of the driving support system 16 has insufficiently studied usage conditions of users, the improper-control detection system 1 according to the embodiment can promptly respond to the problem of the algorithm. The service to users can be thereby enhanced.

(Other Modifications)

The improper-control information can be otherwise include any information relating to images of surroundings of the subject vehicle photographed by the in-vehicle camera, distances to following vehicles or preceding vehicles measured by the millimeter radar, vehicle speeds detected by the speed sensor, steering angles, and various operating states of a traction control system or an ABS system. Furthermore, when a weather condition including temperatures can be obtained, the improper-control information can include the weather condition at this moment. Furthermore, means for detecting the improper-control operation can be not only the steering, the brake, or the accelerator, but also an On-Off switch of the driving support system, an operation of a transmission, an operation of a headlight, or changing a setting value of the driving support system by a user.

It will be obvious to those skilled in the art that various changes may be made in the above-described embodiments of the present invention. However, the scope of the present invention should be determined by the following claims.

What is claimed is:

1. An improper-control detection system for driving support, the improper-control detection system comprising:

an automatic driving control that automatically controls a steering device, a brake device and an accelerator device for a vehicle based on an algorithm of a driving support system;

an in-vehicle detection system that is mounted in the vehicle; and a center device that is in a center and communicates with the in-vehicle detection system, wherein, when the in-vehicle detection system detects an improper-control operation that a driver of the vehicle conducts during the automatic control by the automatic driving control so as to change to a manual control contrary to the automatic control, the in-vehicle detection system sends to the center device improper-control information that includes at least one of a time, a position, a version of the driving support system, and a determination value, and wherein the center device collects and analyzes the improper-control information sent from the in-vehicle detection system to then designate a cause of the improper-control operation.

2. The improper-control detection system of claim 1, wherein the center device sends to the in-vehicle detection system an analysis result obtained by collecting and analyzing the improper-control information, and wherein the in-vehicle detection system reflects the analysis result sent from the center device on the driving support system.

3. The improper-control detection system of claim 1, wherein the center device stores an analysis result obtained by collecting and analyzing the improper-control information in a form so that the analysis result is able to be reflected on the driving support system.

4. An in-vehicle detection system that is mounted in a vehicle having an automatic driving control that automatically controls a steering device, a brake device and an accelerator device for a vehicle based on an algorithm of a driving support system, and included in an improper-control detection system for driving support along with a center device that is in a center, wherein the in-vehicle detection system and the center device communicate with each other, the in-vehicle detection system comprising:

a detecting unit that detects an improper-control operation that a driver of the vehicle conducts during the automatic control by the automatic driving control so as to change to a manual control contrary to the automatic control; and a sending unit that sends to the center device improper-control information that includes at least one of a time, a position, a version of the driving support system, and a determination value when the improper-control operation is detected.

5. A center device that is in a center and included in an improper-control detection system for driving support along with an in-vehicle detection system mounted in a vehicle having an automatic driving control that automatically controls a steering device, a brake device and an accelerator device for a vehicle based on an algorithm of a driving support system, wherein, when the in-vehicle detection system detects an improper-control operation that a driver of the vehicle conducts during the automatic control by the automatic driving control so as to change to a manual control contrary to the automatic control, the in-vehicle detection system sends to the center device improper-control information that includes at least one of a time, a position, a version of the driving support system, and a determination value, the center device comprising:

a collecting unit that collects and analyzes the improper-control information sent from the in-vehicle detection system; and a designating unit that designates a cause of the improper-control operation.

* * * * *